United States Patent [19]

Leonhardt et al.

[11] Patent Number: 5,557,484

[45] Date of Patent: *Sep. 17, 1996

[54] DIFFERENTIATION OF MEDIA TYPES VIA LEADER BLOCK CHARACTERISTICS WHICH INCLUDE A PLURALITY OF LEADER BLOCK RETRIEVAL MEMBERS

[75] Inventors: Michael L. Leonhardt, Longmont; Charles A. Milligan, Golden, both of Colo.

[73] Assignee: Storage Technology Corporation, Louisville, Colo.

[ * ] Notice: The term of this patent shall not extend beyond the expiration date of Pat. No. 5,328,249.

[21] Appl. No.: 320,857

[22] Filed: Oct. 11, 1994

[51] Int. Cl.⁶ .................................................. G11B 15/67
[52] U.S. Cl. ...................... 360/95; 242/332.1; 242/332.4; 226/92
[58] Field of Search .................................. 360/92, 94, 95; 369/36, 38; 242/332.1, 332.4; 226/92

[56] References Cited

U.S. PATENT DOCUMENTS

| | | | |
|---|---|---|---|
| 5,325,249 | 6/1994 | Butts et al. | 360/95 |
| 5,375,235 | 12/1994 | Berry et al. | 395/600 |
| 5,446,874 | 8/1995 | Waclawsky et al. | 395/575 |

*Primary Examiner*—Stuart S. Levy
*Assistant Examiner*—George J. Letscher
*Attorney, Agent, or Firm*—Duft, Graziano & Forest, P.C.

[57] ABSTRACT

Data storage elements that present uniform external dimensions but contain media of varying types and characteristics provide variable data storage and/or recording characteristics. To differentiate between the various media that can be housed within the common form factor, each data storage element is equipped with a leader block having a leader block slot uniquely dimensioned to correspond to the media contained within the data storage element. The leader block slot can be engaged by a mounting pin section on any of a plurality of mounting pins in a media drive.

32 Claims, 10 Drawing Sheets

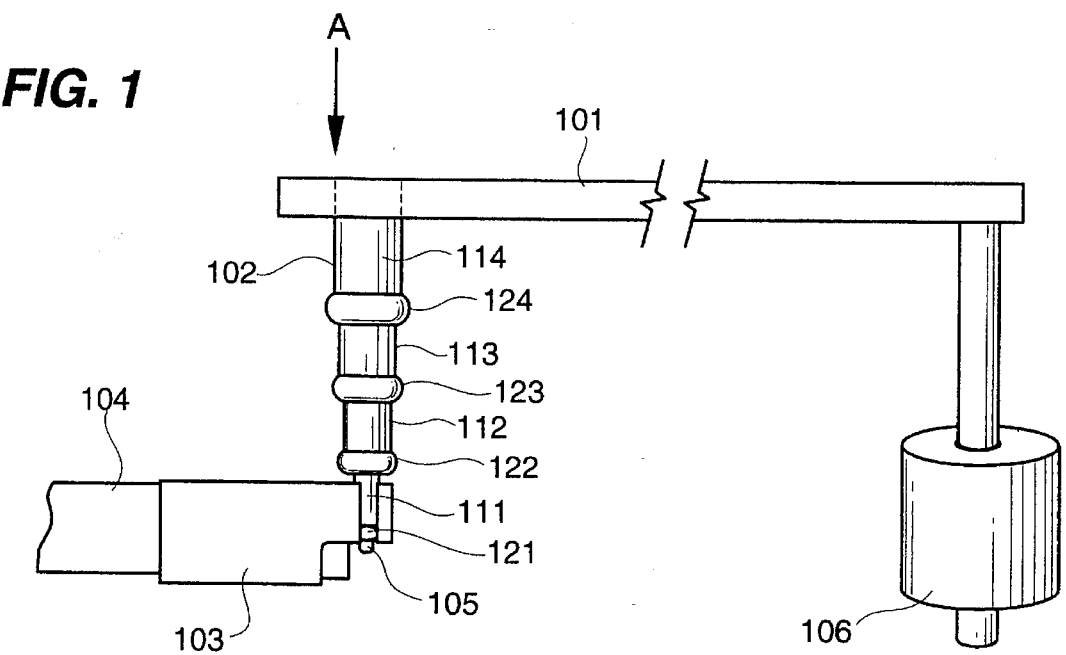
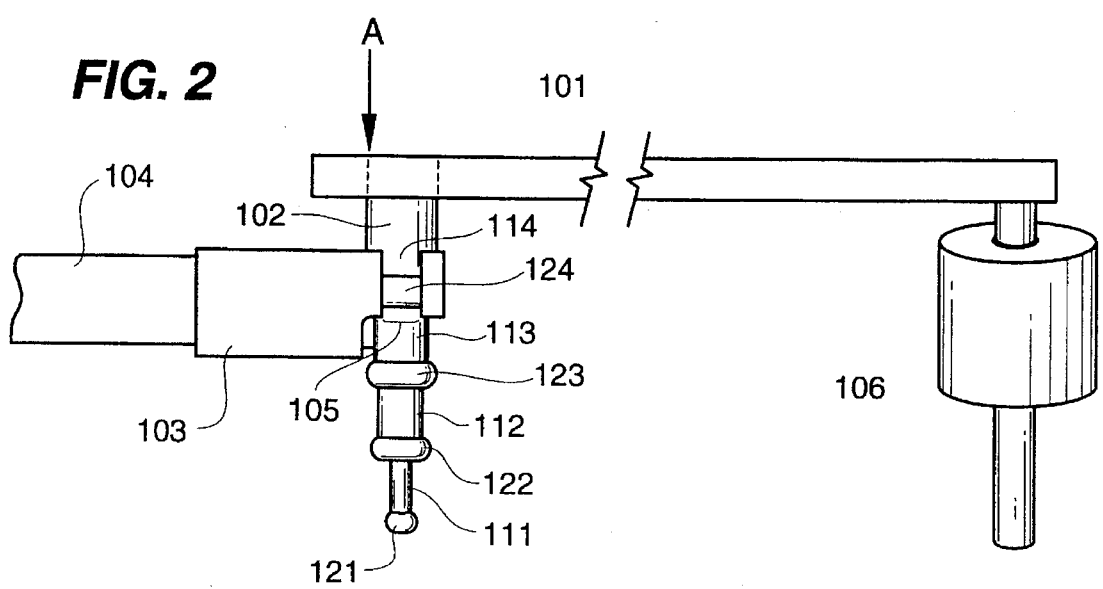

| SECTION NUMBER | SECTION SIZE | PIN / SECTION LOCATION | NUMBER OF MATCHES | INSERTION SEQUENCE |
|---|---|---|---|---|
| 1 | SMALLEST | 2, 4 | 4 | 5 |
| 2 |  | 1, 3 | 2 | 2 |
| 3 |  | 2, 2 | 8 | 3 |
| 4 |  | 3, 1 | 1 | 6 |
| 5 | • | 1, 1 | 12 | 1 |
| • | • | • |  |  |
| • | • | NULL |  |  |
| • |  | • |  |  |
| N | LARGEST | 2, 1 | 3 | 4 |
| 1405 | 1410 | 1415 | 1420 | 1425 |

5,557,484

DIFFERENTIATION OF MEDIA TYPES VIA LEADER BLOCK CHARACTERISTICS WHICH INCLUDE A PLURALITY OF LEADER BLOCK RETRIEVAL MEMBERS

FIELD OF THE INVENTION

This invention relates to highly flexible data storage systems and, in particular, to an improved system for efficiently differentiating among a large plurality of media types, each capable of being housed within a data storage element having substantially uniform external housing dimensions.

PROBLEM

It is a problem to provide a computer installation with flexible, efficient, and cost effective data storage systems for high performance and high capacity computer installations. Individual data storage systems are typically based on single media types that are often incompatible with media types of other data storage systems. In addition, individual data storage systems typically have media specific mechanical, electrical, and operational interfaces and protocols.

A computer system user wishing to take advantage of the positive characteristics of an individual media type from among a multitude of media types must, therefore, invest in a significant number of different data storage systems in order to appropriately match the capabilities of each media type with the user's data processing requirements. The cost of obtaining, configuring, and maintaining such a multiplicity of dedicated data storage systems is prohibitive and relatively inflexible with respect to the changing needs of data storage system users.

Automated data storage systems, such as the 4400 Automated Cartridge System manufactured by Storage Technology Corporation, directly address the data storage users' primary storage needs by providing a highly efficient and adaptable removable media data storage system. The traditional automated data storage system stores thousands of industry standard 3480 magnetic tape cartridges, where each cartridge contains a single reel of longitudinal magnetic tape that is compatible with a corresponding tape drive within the automated system.

To provide automated access to media types other than longitudinal tape, alternative media types are housed in cartridges having substantially the same external dimensions as the longitudinal tape, and the automated storage system is fitted with corresponding media drives. Using standard sized cartridges, more generically known as data storage elements, allows the automated system the flexibility to physically store, retrieve, and present any data storage element to a media drive in a uniform fashion regardless of the media type therein. By providing access to multiple media types in an automated data storage system, users can take advantage of each media type's unique storage and/or recording characteristics coupled with the efficiency and responsiveness provided by an automated system.

However, because the exterior dimensions of the data storage elements are uniform, there arises a problem of differentiating among the media types within the data storage elements. If a media type is presented to an incompatible media drive, damage can result to either the media contained within the data storage element, or to the media drive, or both. The potential for damage is magnified by the advances in media drive recording, playback, and mounting techniques which have eliminated the one-to-one correspondence of media type to media drive. Presently one media drive can often accommodate at least two media types and advances in the media drive art are continually increasing the variety of media types a single media drive can accommodate. It is essential that the time required to differentiate and mount a media type be minimized.

The methods for identifying the media type within a data storage element include either using machine readable labels or merely attempting to access the media. However, machine readable labels are prone to damage and misreading. Further, where the media type and media drive are incompatible, accessing the media itself typically results in damage to the media drive, the media itself, or both.

Presently, the only known system that positively identifies media types by physical keying uses a single leader block mounting pin having multiple graduated pin sections. Each pin section is keyed to match the leader block slot of only one of the media types that are compatible with the immediate media drive. The physical keying of a mounting pin and media type provides a positive mechanical lock-out ensuring that a media drive will only access a compatible media type, thereby avoiding any damage that might otherwise occur by actually accessing the media type. This solution, however, can negatively impact media mounting and access times because attempting each pin section to find the one that fits the leader block slot for a given media type is a slow process. Further, with advances in media drive technology, a single mounting pin does not, by itself, have enough pin sections to distinguish between the rapidly growing number of media types that one media drive might accommodate. Therefore, it has become a significant problem to increase the number of pin sections available in the limited mounting pin space within a media drive, while at the same time reducing the overall physical size and complexity of the media drive and reducing the search time required to locate the pin section that matches a media type.

SOLUTION

The above described problems are solved and a technical advance achieved in the field by the improved differentiation of media types via leader block characteristics. The present invention significantly increases the number of media types distinguishable by a single media drive, by integrating multiple mounting pins, each with multiple pin sections, in the limited mounting pin space within a media drive which previously accommodated only one mounting pin. Further, the search time required to locate the mounting pin section that matches a media type is reduced by implementing intelligent mounting pin presentation schemes including, but not limited to, sequential, statistical, interval halving, predetermined ordering, or any combination thereof.

Although based upon a singe reel 3480 -type magnetic tape cartridge system, the alternative media types capable of being housed in a data storage element for manual or automated use include, but are not limited to, thick and thin longitudinal magnetic tape, helical tape, magnetic disk, optical disk, and semi-conductor media. Where a non-tape media is contained in the data storage element, the leader block serves to interconnect the particular media type with the storage device via an opening or an access port, or by an extracted mating connector attached to a leader block.

BRIEF DESCRIPTION OF THE DRAWING

FIGS. 1 and 2 illustrate the basic apparatus for differentiating media types via leader block characteristics;

DETAILED DESCRIPTION

Standard Data Storage Element Housing

Figure 3:
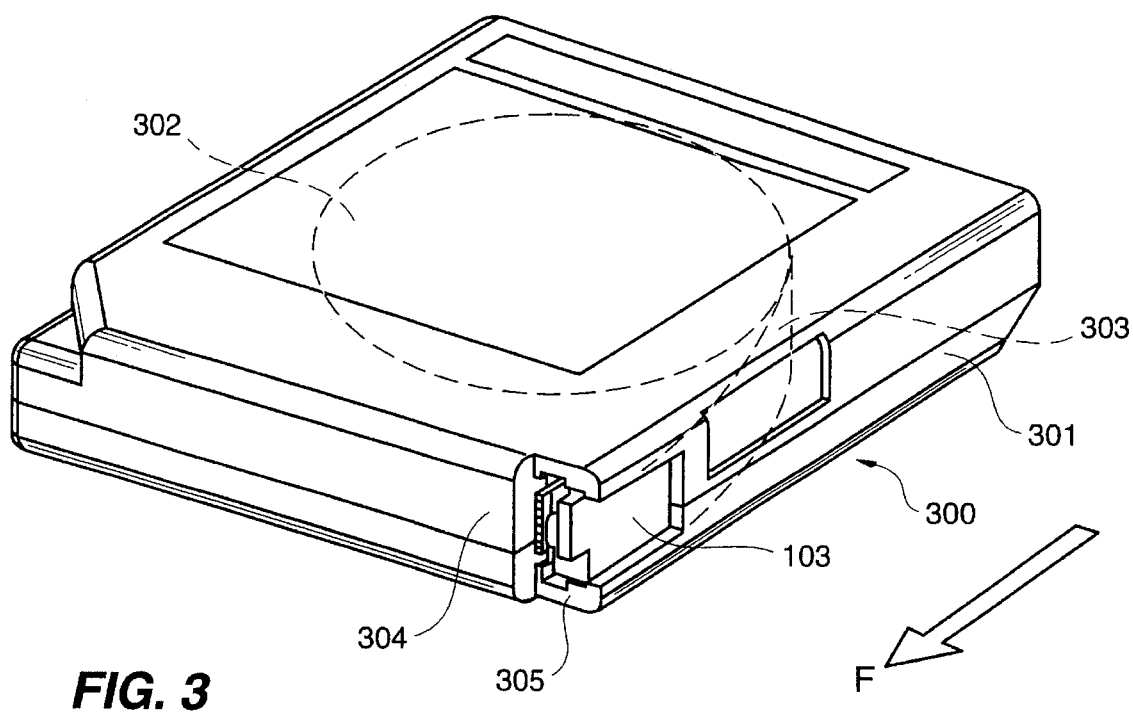
FIGS. 3, 4 and 7 illustrate examples of alternative media types within a data storage element housing.

FIG. 3 illustrates a data storage element 300 which is similar in external dimensions to the standardized 3480-type magnetic tape cartridge. The relative dimensions of this or any other data storage element illustrated herein serve only as examples, not as limitations. Therefore, the present invention is applicable regardless of a data storage element's external housing dimensions, provided the dimensions are uniform among all data storage elements in a given system.

The data storage element 300 has an external data storage element housing 301 that has a front side 304 and a leader block opening 305. The data storage element housing 301 contains a single reel of magnetic tape 302 that has a free tape end 303 with a leader block 103 attached thereto. The leader block opening 305 holds the leader block 103 in place until such time as the data storage element 300 is presented to a tape media drive 606 (shown in FIG. 6), in direction F front side 304 first. When the data storage element 300 is presented to the tape media drive 606, the free tape end 303 is withdrawn from the data storage element housing 301 by way of engaging the leader block 103 with a mounting pin 102 (shown in FIG. 1) that is attached to a media loading arm 101 (shown in FIGS. 1 and 6).

Figure 6:
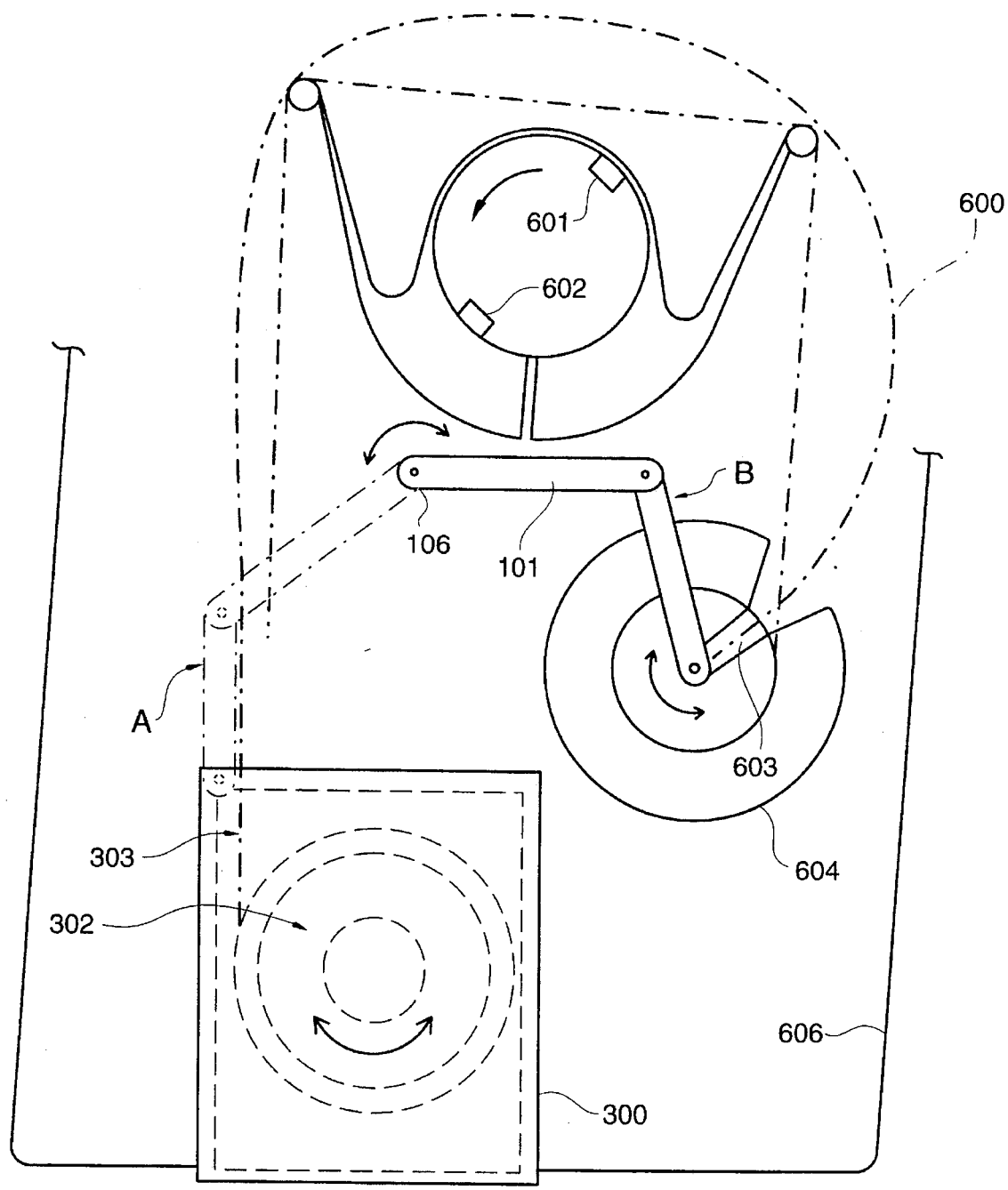
FIG. 6 illustrates the predefined path across read/write heads to a take-up reel taken by a tape media type.

FIG. 6 illustrates an example of the tape loading process that occurs after data storage element 300 is inserted into a tape media drive 606. For tape media, a predefined media loading arm path 600 exists along which the free tape end 303 of a single reel of magnetic tape 302 is drawn from data storage element 300. The tape traverses the read/write area 601 and 602, toward and into a take up reel slot 603 of a take up reel 604. A positioning system 106 controls movement of the media loading arm 101. The media loading arm path 600 is traversed by the media loading arm 101, from an unloaded position A, to a loaded position B, without an intervening handoff.

Media Differentiation Apparatus

FIG. 1 and 2 illustrate a leader block retrieval member also known as a "mounting pin", used to differentiate a media type. In FIG. 1, the media loading arm 101 attached at one end to positioning system 106 controls the media loading arm 101 movement. A mounting pin 102 has a plurality of coaxially aligned mounting pin sections 111–114 attached thereto at the distal end of media loading arm 101. Each mounting pin section 111–114 represents and uniquely corresponds to a single media type which the associated media drive is capable of mounting for read/write procedures. The leader block mounting pin 102 in FIGS. 1 and 2, for example, has four sections 111, 112, 113, and 114 indicating that its associated media drive can mount and successfully read and/or write to four different media types, any one of which may be individually housed in a data storage element. Mounting pin sections 111–114 are separated from adjacent sections via one of a plurality of spacers 121–124.

Although one media drive may be capable of reading and/or writing to more than one media type as indicated by the presence of multiple mounting pin sections 111–114, each leader block slot 105 is uniquely sized to represent the one media type contained within the data storage element. Therefore, if no one mounting pin section 111–114 engages leader block slot 105, then the media 104 is not compatible with the media drive attempting to mount the media and the data storage element is rejected.

Accessing Alternative Media Types

The typical media type within a commercially available data storage element is one-sided magnetic tape. Among the more recent tape media types available is the helical scan magnetic tape which adds to the variety of data storage characteristics for magnetic tape media. The data storage characteristics can include data recording format (longitudinal or helical), tape dimensions (thick or thin/length of tape on reel), magnetic coating on the tape (iron-oxide or chromium dioxide or barium ferrite), write protection status. Beyond this variety of magnetic tape media types, however, are numerous other media types that include, but are not limited to, thick and thin longitudinal tape, audio/video tape, optical disk, magnetic disk, and semi-conductor based media.

Figure 4:
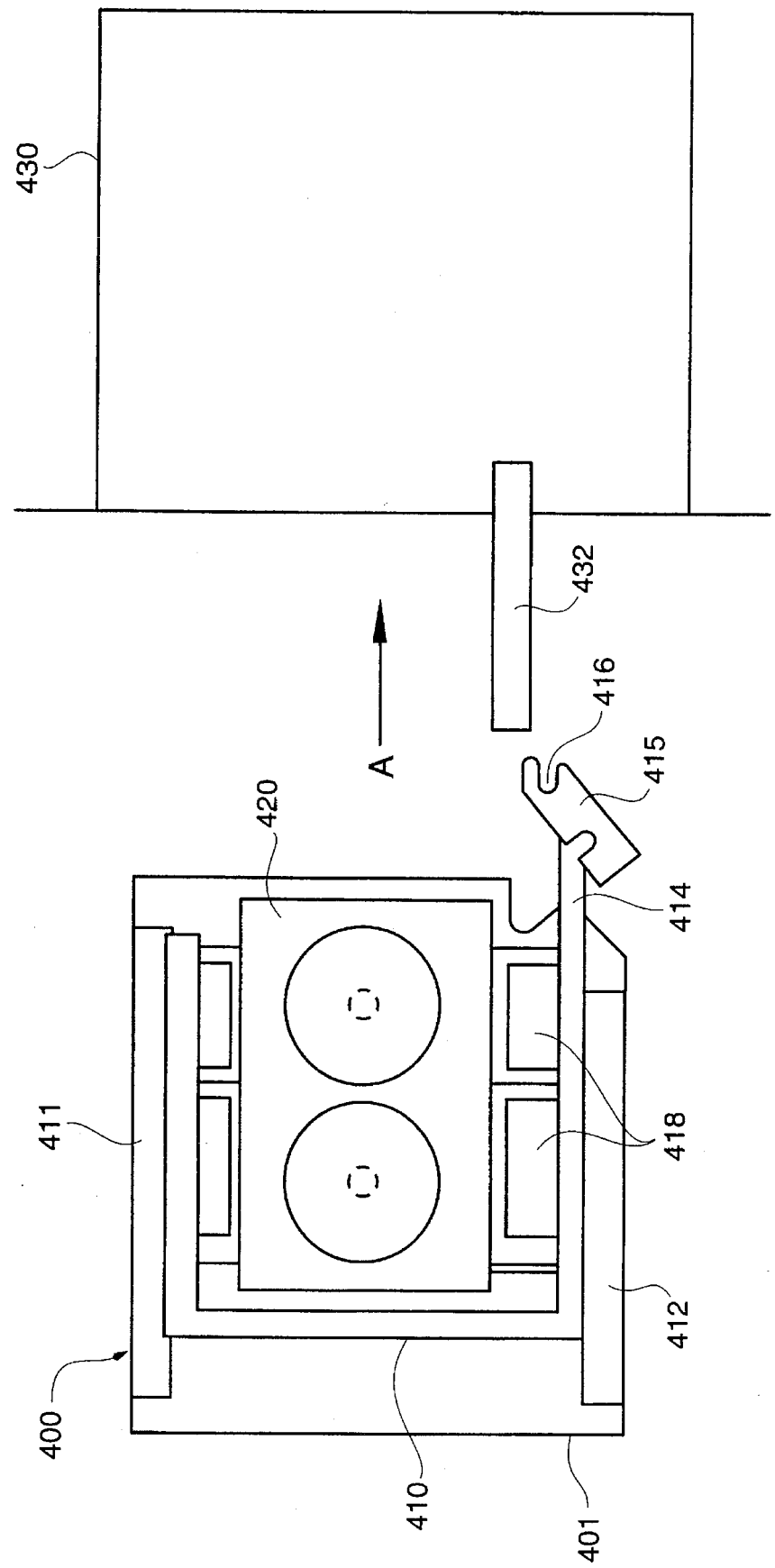

FIG. 4 illustrates a data storage element 400 that has an exterior data storage element housing 401 substantially similar to the industry standard 3480-type cartridge illustrated in FIG. 3. In general, the media type within a data storage element is indistinguishable based on external dimensions or appearance. Here, the data storage element contains a multiple reel tape media 420 that may contain multi-media data including but not limited to, video, audio, or computer data stored in analog or digital form. To access this media, data storage element 400 contains a carrier 410 which is slidably connected to a pair of carrier guide rails 411 and 412 or other mechanism permitting the carrier 410 to be withdrawn from the data storage element housing 401. The guide rails 411 and 412 are affixed to the interior Walls of exterior data storage element housing 401 on opposite facing interior walls thereof. Carrier 410 is extensible from a loaded position, wherein it is located fully within exterior housing 401 to a position exterior to housing 401. As a matter of design choice, the carrier 410 and media 420 can be rotated 90 degrees from the position presently shown, in either a vertical or horizontal perspective.

The media in FIG. 4 can be accessed in a number of ways. A leader block 415 can be used as an element to accomplish the carrier withdrawal function. The leader block 415 is affixed either directly to carrier 410, or to a leader block extension arm 414 that is itself affixed to carrier 410 to provide a point of contact for a media loading arm 432 from the media drive 430. A mounting pin (not shown) at the distal end of the media drive loading arm 432 would engage leader block 415 in order to pull carrier 410 and its associated media 420 out of data storage element housing 401 in the direction indicated by arrow A. Carrier 410 is of a configuration and dimension to support in a secure manner, via retention grips 418, the media type 420 housed within data storage element 400. The media type 420 can be a two reel tape cassette as shown in FIG. 4, or any other self-contained alternative media such as, but not limited to, disk or semi-conductor. Regardless of the media on the carrier 410, the media itself is drawn toward an appropriate read/write interface within the media drive 430.

Figure 7:
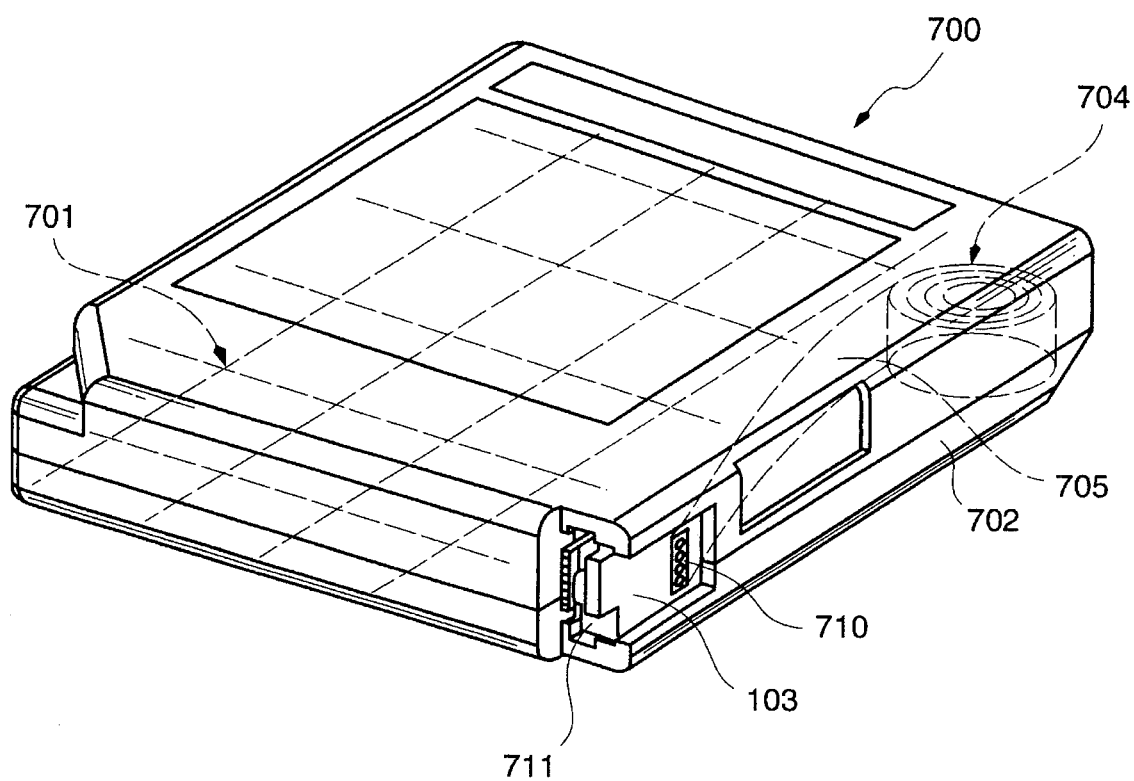

FIG. 7 illustrates a data storage element 700 containing a semi-conductor based media 701. To access this media, a leader block 103 is attached to the end of a ribbon cable 705 with a cable interface 710 attached therebetween. When the leader block is withdrawn, the trailing ribbon cable 705 is also withdrawn from a holding area 704 so that the cable interface 710 can be plugged into a compatible interface within the media drive to facilitate read/write operations to the media 701. The location and implementation of the holding area 704, the type and configuration of semi-conductor media 701, and the type of cable interface 710 whether male, female, pin, tab, or any other combination well known in the art, are interchangeable as a matter of design choice.

As an alternative embodiment to FIG. 7, the cable interface 710 can be located in a fixed position at or near the leader block slot 711. When the leader block slot 711 is engaged by a matching mounting pin (not shown), the cable interface 710 is revealed so that a compatible interface from within the media drive can freely connected to the cable interface 710.

Improved Media Differentiation Apparatus

Figures 9, 14:
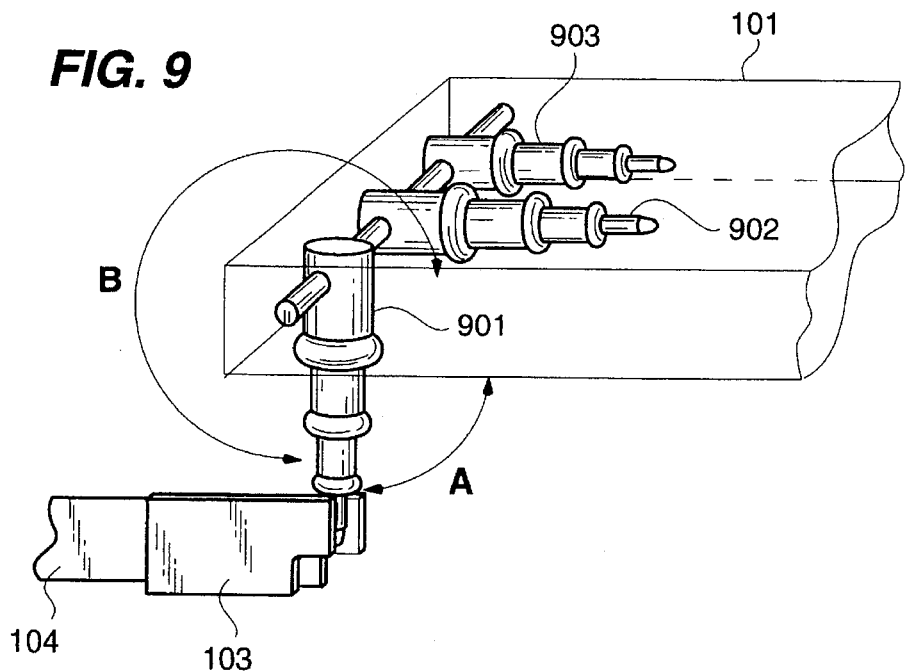
FIGS. 9, 10 and 11 illustrate alternative mounting pin embodiments for multiple mounting pins.
FIG. 14 illustrates a look-up table used by the media drive control system.

FIG. 9 illustrates media loading arm 101 with multiple mounting pins 901, 902, and 903 retractably mounted at the distal end of media loading arm 101. One pin is presented at a time, here pin 901, while remaining pins 902 and 903 remain retracted so as to maintain a low profile along the mounting path in the event a mounting pin section on mounting pin 901 engages leader block 103. The multiple pins 901, 902, and 903 can be presented or withdrawn in direction A or B as a matter of design choice. In addition, the deployed mounting pin, here 901, can be locked in place prior to attempting to engage the leader block 103 by moving the media loading arm 101 toward the leader block 103. Alternatively, the media loading arm 101 can remain positioned over leader block 103 as a resistance sensitive mechanism lowers mounting pin 901 in direction A or B toward the leader block slot. Other retractably mounted mounting pin configurations are considered within the scope of this embodiment and can be implemented as a matter of design choice.

Figure 10:
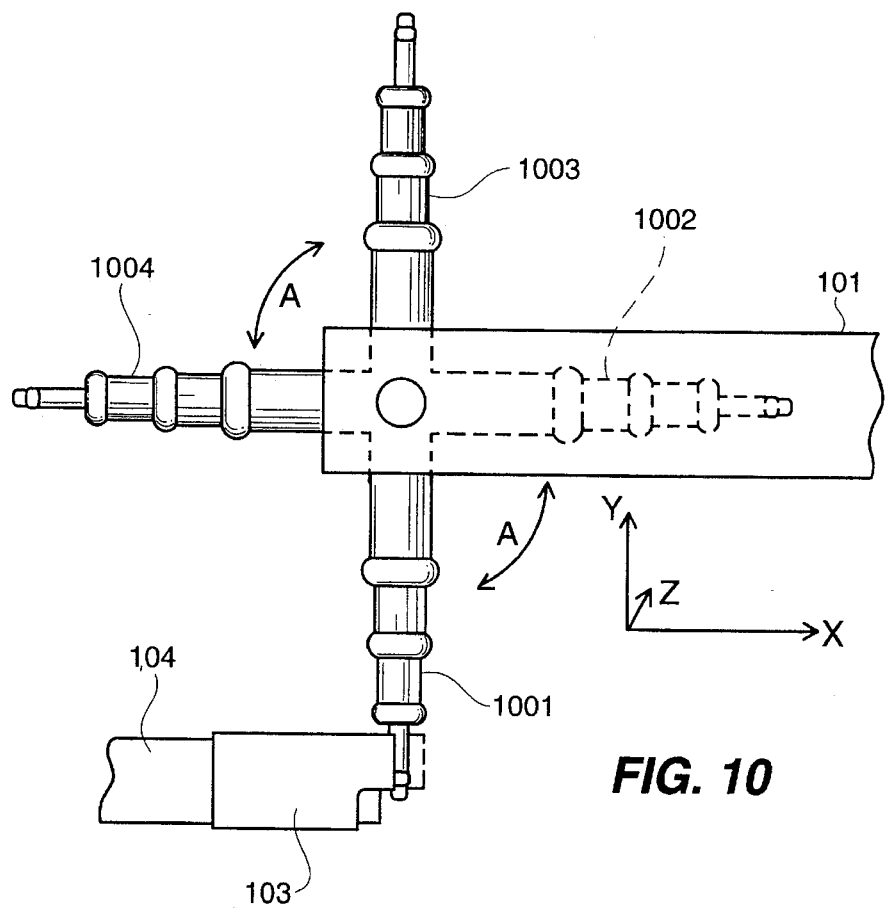

FIG. 10 illustrates a pinwheel embodiment where multiple pins 1001, 1002, 1003, and 1004 are rotatably mounted at the distal end of media loading arm 101. The preferred rotation is along the X,Y plane in direction A. The rotation plane for the multiple pins and the number of pins are a matter of design choice so that, for example, all the mounting pins can be downwardly and ridgedly fixed to a carousel that positions a mounting pin by rotating the carousel in the X,Z plane. Alternatively, based on FIG. 9 and/or FIG. 10, all mounting pins can be downwardly and rigidly fixed to the distal end of the media loading arm 101, so that the entire media loading arm 101 moves in the X,Y,Z plane to position a mounting pin and insert a pin section.

Figure 11:
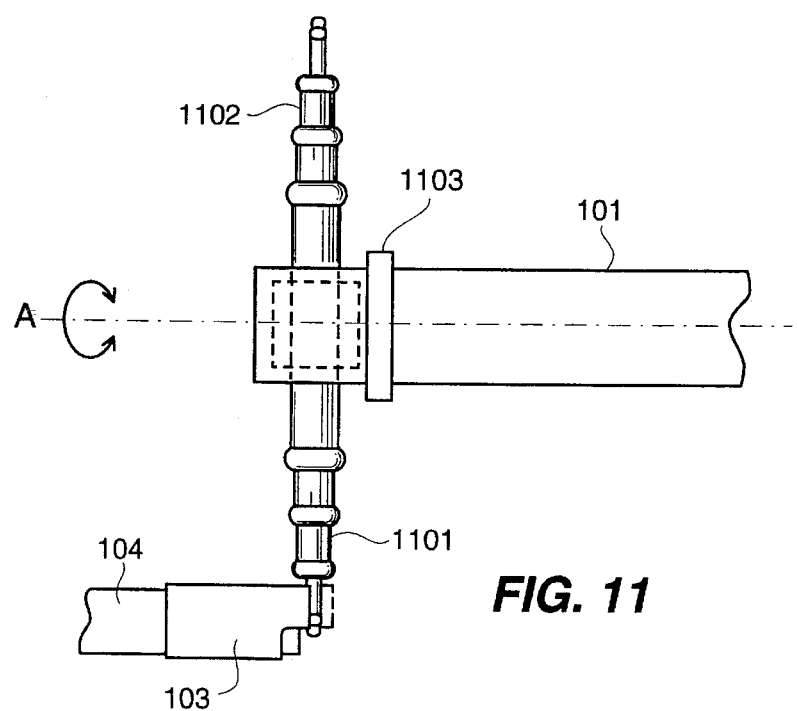

FIG. 11 illustrates a pinwheel embodiment where opposing pins 1101 and 1102 are rotatably mounted in direction A of the Y,Z plane at the distal end of media loading arm 101. The Z plane can be either into the page or out of the page. The preferred rotation plane for the multiple pins is in the Y,Z plane perpendicular to the media loading arm 101 at rotation point 1103. It is a matter of design choice to have more than two pins as in FIG. 10, alter the rotation plane, or combine other embodiments disclosed herein.

Figure 12:
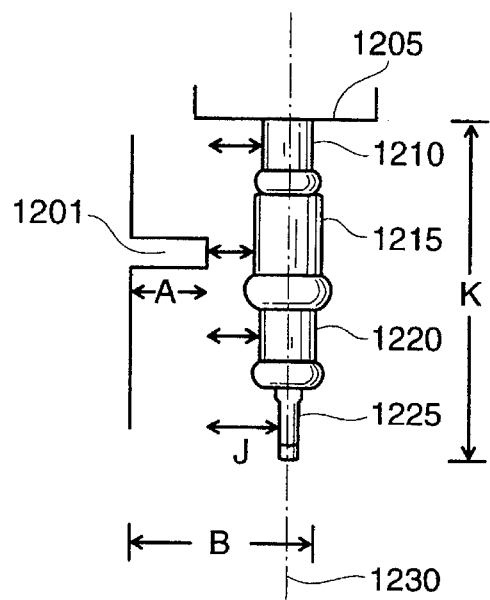
FIG. 12 illustrates the apparatus accompanying media drive control system initialization and calibration.
Figure 13:
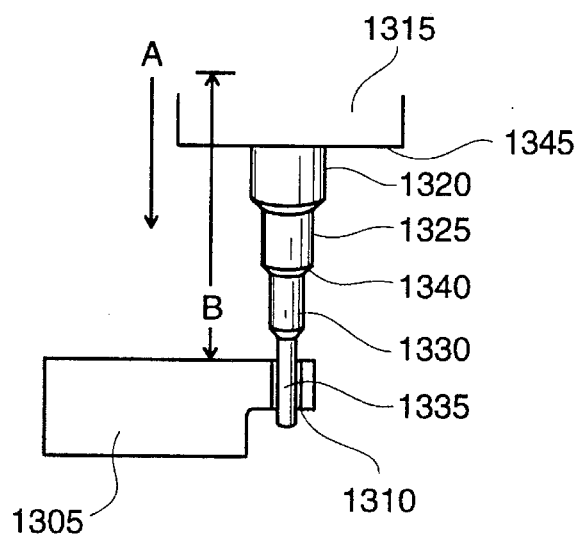
FIG. 13 illustrates a mounting pin used for engaging a leader block with single direction motion.

FIGS. 12 and 13 illustrate alternative mounting pin configurations to that illustrated in FIG. 1. FIG. 12 illustrates a non-linear ordering of the graduation of pin section sizes. This alternative facilitates a more efficient sequential search from bottom up or top down provided the likelihood of occurrence of media types is predetermined and the pin sections are arranged accordingly.

FIG. 13 illustrates a mounting pin without the plurality of spacers 121, 122, 123, and 124 shown in FIG. 1. In FIG. 13, the separation 1340 between pin sections 1325 and 1330 is a sloped edge. This configuration facilitates single direction motion for mounting pin insertion beginning with the smallest pin section 1335. The mounting pin 1315 is lowered in direction A into leader block slot 1310 until a predetermined level of resistance is encountered. Encountering resistance means that either the entire distance B was traversed up to surface 1345, or a mounting pin section shoulder, 1340 for example, is too large to enter the leader block slot 1310. In either case, attempting to withdraw the leader block 1305 will either do so because an appropriate sized pin section has engaged leader block slot 1310, or the pin section presently within the leader block slot 1310 will merely pass through the leader block slot 1310 because the pin section is too small to engage. The system identifies the media type being withdrawn based on the distance "B" traversed prior to encountering the resistance.

Media Differentiation Control System

A media drive control system manages the media differentiation's initialization, calibration, error recovery, and operational steps. Initialization, calibration, and error recovery are equivalent processes that facilitate the systems' ability to establish or reestablish known operating parameters. The operational steps differentiate one media type from among many by implementing a variety of algorithmic based methods including, but not limited to, sequential, statistical, internal halving, pre-determined ordering, dynamic, and any combination thereof.

FIG. 12 illustrates a calibration configuration that allows the system to determine precise locations and sizes of the mounting pin sections available to the media drive. Self calibration is a flexible feature that permits adding or removing mounting pins or mounting pin sections due to system upgrades. When the system reinitializes, it determines what mounting pin sections are on which mounting pin and in what location so that appropriate columns 1405, 1410, and 1415 of FIG. 14 can be constructed. In operation, a benchmark 1201 of known size "A" is located in a fixed position within or adjacent to the distal end of the loading arm in a media drive. The media drive control system positions mounting pin 1205 in a known start position 1230 relative to benchmark 1201. Each mounting pin section 1225, 1220, 1215, and 1210 is then placed in contact with benchmark 1201 in turn to determine the distances "J" and "K" for each mounting pin section and the mounting pin section size. Where mounting pin 1205 moves a distance "B", the system determines that no pin section exists at that distance "K".

Figure 5:
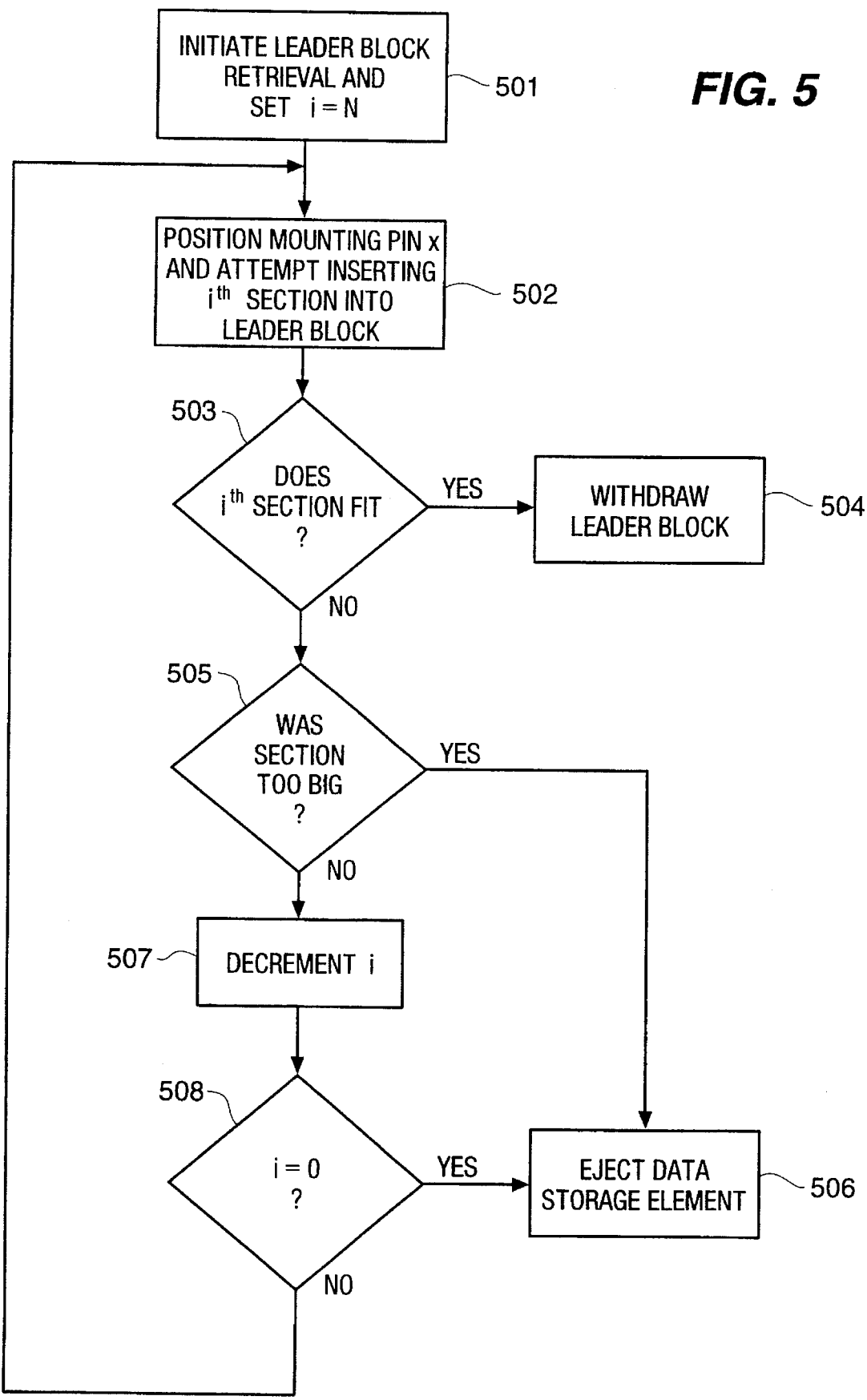
FIG. 5 illustrates, in flow diagram form, the sequential operational steps taken to engage the leader block with a mounting pin.

FIG. 5 illustrates, in flow diagram form, the operational steps taken by a media drive control system when differentiating media types in sequential fashion. The sequential method attempts to engage a leader block slot by sequentially presenting each mounting pin section of a given mounting pin, until all sections on a mounting pin have been attempted. The present illustration is arranged for the mounting pin configuration shown in FIGS. 1 and 2 where each mounting pin is arranged from small mounting pin section 111 to big mounting pin section 114. However, the mounting pins and mounting pin sections on each pin can be arranged in any other order including, but not limited to, largest section to smallest section, and mixed large and small sections. Further, the present illustration can be modified so that the mounting pins and mounting pin sections thereon are presented in any sequential order including, but not limited to, largest section to smallest section, top section to bottom section, leftmost pin to rightmost pin, or any variation thereof. All sequential variations are considered within the scope of the steps discussed below.

At step 501, in response to a data storage element being mounted in a media drive, the control system initiates leader block retrieval operations by setting variable "i" to a total number of mounting pin sections "n" among all available mounting pins. It is a matter of design choice to approach this problem on an individual mounting pin basis rather than the total number of sections across all available mounting pins. At step 502, the control system activates positioning system 106 (of FIG. 1) to position the proper mounting pin and attempt to insert the "i"th mounting pin section into leader block slot 105. At step 503, the control system determines whether section 111 engages slot 105 by attempting to withdraw leader block 103 from the data storage element. If the mounting pin section 111 matches the dimensions of leader block slot 105, movement of the media loading arm 101 will cause mounting pin 102 to withdraw leader block 103 from the data storage element 300 at step 504. If mounting pin section 111 does not fit mounting pin slot 105, processing continues at step 505 where the control system determines whether mounting pin section 111 was too big to match mounting pin slot 105. If section 111 was too big, then the data storage element is ejected at 506 because any remaining mounting pin sections are only bigger than section 111 where the sections are ordered from small to large. If section 111 was not too big, then processing continues at 507 where the variable "i" is decremented and at step 508 the variable i is tested to determine whether another mounting pin section exists. Once "i" equals zero, then no other sections exist and the data storage element is ejected at 506. If "i" is non-zero, processing continues at 502 until either a section matches the leader block slot 105 or no other sections are available.

Numerous alternative implementations exist for the sequential method of FIG. 5 and are considered within the scope of examples presented herein. The alternatives include, but are not limited to, presenting the mounting pin sections in order of the largest section to the smallest section where the step at 505 would ask "was the section too small?," or beginning with the leftmost or rightmost of multiple mounting pins, or any combination of the above. Further, the value "n" represent the number of mounting pin sections on any one pin or the total number of sections across multiple mounting pins. The value "n" can also be a predetermined "hardcoded" value, or calculated at initialization time.

Statistical methods for differentiating media types are based on intelligent decision tree systems that determine which mounting pin section from among multiple mounting pins to attempt next. Statistical methods locate the potentially matching mounting pin section more quickly than proceeding through a sequential search of each mounting pin section, thereby reducing media mounting time while ensuring that the media drive is accessing a compatible media type. Statistical methods include, but are not limited to, a static sequential approach where the mounting pin section presentation order is statistically predetermined and executed independent of the physical mounting pin section ordering, an interval halving approach where the next mounting pin section being attempted is the midpoint pin section of the remaining pin sections being attempted, and a decision tree approach where the control system identifies the most commonly occurring media types encountered by a given media drive so that the mounting pin presentation scheme can be ordered accordingly. The above approaches may be combined as a matter of design choice and such combinations are considered within the scope of the statistical approaches described herein.

The decision tree approach is considered the best method because the implementation accomplishes any of the above methods based on a map of the physical location of each mounting pin section among multiple mounting pins. With a section location map, the system can position any mounting pin section from any mounting pin, to engage and withdraw a leader block. FIG. 14 illustrates a location map containing relevant decision tree information in standard lookup table format. Among the information stored in such a database are the mounting pin section numbers 1405, the relative mounting pin section sizes 1410, the mounting pin number "q" and pin section "r" location 1415, the frequency of occurrence 1420 for each mounting pin section 1405, and insertion sequence matrix 1425 for each mounting pin section 1405 based on the frequency of occurrence 1420 and the next most probable pin section to attempt based on the last section attempted.

Figure 8:
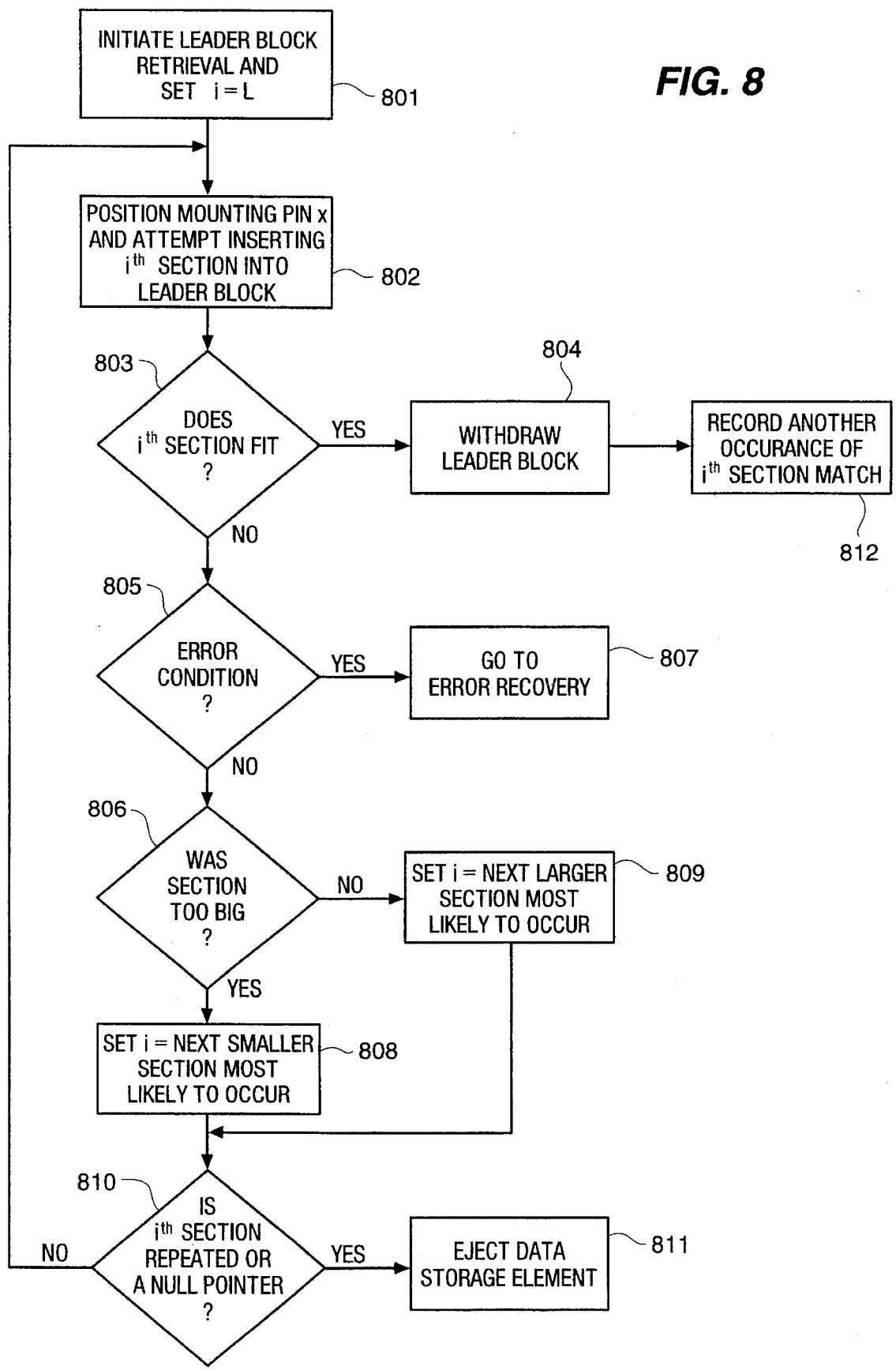
FIG. 8 illustrates, in flow diagram form, the statistically based operational steps taken to engage the leader block with a mounting pin.

FIG. 8 illustrates the decision tree method. At 801, the variable "i" is set to a value "1" Which represents the first mounting pin section being attempted from among the multiple mounting pins. Other starting points for the first pin section may be selected based on the most frequently occurring section, the median sized or physically central pin section, or any other desired starting point. The appropriate mounting pin is positioned to the "i"th mounting pin section at 802, and the system attempts to engage the leader block slot. If the leader block slot is engaged at 803, then the media type is compatible with the media drive and the leader block is withdrawn at 804. At 812, the database columns in FIG. 14 are updated to reflect the mounting pin section match 1405, and the frequency of occurrence statistics 1425 are recalculated based on this new information.

If at 803, the mounting pin section does not fit, then the system determines at 805 whether there was no match due to an error condition. If an error condition or any unknown mounting pin positioning state exists, processing continues into error recovery at 807. Error recovery may consist of merely attempting to engage the leader block slot with same mounting pin, or reinitializing and/or recalibrating the immediate media drive prior to continuing service as needed or rebuild the location map in FIG. 14.

Where no error condition exists at 805, the system determines at 806 whether the attempted mounting pin section was too big for the leader block slot. This determination is accomplished by the system's sensitivity to the positioning tolerances based on the calibration during initialization. If the attempted mounting pin section was too big, then the variable "i" is reset at 808 to the physical location of the next most frequently occurring smaller mounting pin section. The map location is tested at 810 to see if a null pointer was retrieved from the map. If the present pin section has already been attempted or a null pointer exists, the data storage element is ejected at 811 because no other pin section is available. If a valid location exists, then processing continues at 802.

Alternative embodiments to the method illustrated in FIG. 8 are considered within the scope of the present embodiment. Such alternatives include, but are not limited to, implementing the statistical approach of FIG. 8 on an individual mounting pin basis for each mounting pin available, or configuring one of the multiple mounting pins to contain the most frequently occurring pin sections so as to avoid skipping from pin to pin to find the most likely sections. In addition, where two or more sections are equally frequently occurring, the equal sections can be searched on a sequential basis based on size, or any other method previously discussed. Further, determining which pin section to attempt next may be based on the most statistically probable or logical choice from the present pin section, or the most probable next section based on the most recently mounted media type. Other alternatives or combinations are considered within the scope of this invention.

Summary

The use of leader blocks that include a slot having unique dimensions keyed to represent the type of media contained within a data storage element, enables a media drive to make use of a multi-segmented multi-pin media differentiation system to distinguish between a plurality of different media types that can be read and/or written by a given media drive without damage to the media or the media drive. The media differentiation system attempts to engage the leader block slot with individual sections of the mounting pins on a media drive by various approaches including, but not limited to, sequential, statistical, interval halving, pre-determined ordering, or any combination thereof. The keyed mounting pin arrangement prevents inadvertently mounting an incompatible media type in a media drive thereby causing damage to the media, the media drive, or both.

While specific embodiments of this invention are disclosed herein, it is expected that those skilled in the art can and will design alternate embodiments of this invention that fall within the scope of the following claims.

We claim:

1. A media differentiation and retrieval system for use with a media drive that reads/writes data on a plurality of different media types, each of said media types being individually housed in a data storage element, said data storage element having an opening in one end for securing a leader block, said leader block being attached to the one of said plurality of different media types housed in said data storage element, and a leader block retrieval slot in said leader block that is uniquely keyed to identify the one of said plurality of different media types housed in said data storage element, said media differentiation and retrieval system comprising:

a plurality of leader block retrieval members each being attached at the distal end of a media loading arm and having at least one coaxially aligned retrieval member section, wherein each said at least one retrieval member section corresponds to only one uniquely keyed said leader block retrieval slot;

means, responsive to said data storage element being inserted into said media drive, for inserting successive ones of said at least one retrieval member section from said plurality of leader block retrieval members into said leader block retrieval slot according to an insertion sequence; and means, responsive to one of said at least one retrieval member section engaging said leader block retrieval slot, for retrieving said leader block from said data storage element;

wherein said plurality of leader block retrieval members are attached to said media loading arm when said leader block is retrieved from said data storage element to travel along a media mounting path within said media drive; and wherein an engaged one of said plurality of leader block retrieval members is in a first position for engaging said leader block retrieval slot while unengaged ones of said plurality of leader block retrieval member are in a second position proximate to said first position to avoid engaging said leader block retrieval slot and to avoid engaging structure within said media drive proximate to said media mounting path during media mounting.

2. The media differentiation and retrieval system of claim 1 including:

means for storing data in a memory, said data being indicative of size and location of said at least one retrieval member section on said plurality of leader block retrieval members.

3. The media differentiation and retrieval system of claim 2 further including:

a benchmark member within reach of said media loading arm; and means for determining size and location of said at least one retrieval member section on said plurality of leader block retrieval members relative to said benchmark member.

4. The media differentiation and retrieval system of claim 2 further including:

means for calculating a frequency of occurrence of each said media type encountered by said media drive;

means, responsive to said means for calculating said frequency of occurrence, for updating an insertion sequence for said means for inserting successive ones of said at least one retrieval member section; and means for storing said frequency of occurrence and said insertion sequence in said memory.

5. The media differentiation and retrieval system of claim 1 wherein said plurality of leader block retrieval members includes:

means for retracting at least one of said plurality of leader block retrieval members within said media loading arm; and means for extending each of said plurality of leader block retrieval members one at a time from within said media loading arm.

6. The media differentiation and retrieval system of claim 1 wherein at least two of said plurality of leader block retrieval members are rigidly extended from a rotatable mounting at the distal end of said media loading arm.

7. The media differentiation and retrieval system of claim 1 wherein at least two of said plurality of leader block retrieval members are rigidly extended from the distal end of said media loading arm; and means for inserting successive ones of said at least one retrieval member section into said leader block retrieval slot, by positioning said media loading arm.

8. The media differentiation and retrieval system of claim 1 wherein said insertion sequence is a pre-defined insertion sequence.

9. The media differentiation and retrieval system of claim 8 wherein said pre-defined insertion sequence is sequential from a first retrieval member section located at a first retrieval member end through each adjacent retrieval member section to a last retrieval member section located at a second retrieval member end for each of said plurality of leader block retrieval members.

10. The media differentiation and retrieval system of claim 8 wherein said pre-defined insertion sequence is non-sequential selected from the group consisting of: frequency of occurrence of encountering said media types, next most probable choice in view of past events, next most probable choice in view of past choices, interval halving, and random.

11. The media differentiation and retrieval system of claim 1 wherein said insertion sequence is selected in real time from a plurality of sequences included in the group consisting of: sequential, frequency of occurrence of encountering said media types, next most probable choice in view of past events, next most probable choice in view of past choices, interval halving, and random.

12. The media differentiation and retrieval system of claim 1 wherein said means for retrieving includes:
   means for drawing said leader block along a media loading path through said media drive.

13. The media differentiation and retrieval system of claim 1 wherein said means for retrieving includes:
   means for drawing said media type toward said media drive, said media type being slidably mounted within said data storage element.

14. The media differentiation and retrieval system of claim 1 wherein said means for retrieving includes:
   means for drawing a media interface from within said data storage element into said media drive for reading/writing to said media type.

15. The media differentiation and retrieval system of claim 1 wherein said means for retrieving includes:
   means for inserting a media interface into said data storage element for reading/writing to said media type.

16. A media differentiation and retrieval system for use with a media drive that reads/writes data on a plurality of different media types, each of said media types being individually housed in a data storage element, said data storage element having an opening in one end for securing a leader block, said leader block being attached to the one of said plurality of different media types housed in said data storage element, and a leader block retrieval slot in said leader block that is uniquely keyed to identify the one of said plurality of different media types housed in said data storage element, said media differentiation and retrieval system comprising:
   a plurality of leader block retrieval members each being attached at the distal end of a media loading arm and having at least one coaxially aligned retrieval member section, wherein each said at least one retrieval member section corresponds to only one uniquely keyed said leader block retrieval slot;
   means, responsive to said data storage element being inserted into said media drive, for inserting successive ones of said at least one retrieval member section from said plurality of leader block retrieval members into said leader block retrieval slot according to an insertion sequence in at least one form selected from the group consisting of sequential, frequency of occurrence of encountering said media types, next most probable choice in view of past events, next most probable choice in view of past choices, interval halving, and random;
   means, responsive to one of said at least one retrieval member section engaging said leader block retrieval slot, for retrieving said leader block from said data storage element;
   means for determining a size and location of said at least one retrieval member section on said plurality of leader block retrieval members relative to a benchmark member within reach of said media loading arm;
   means for calculating a frequency of occurrence of each said media type encountered by said media drive;
   means for updating an insertion sequence for said means for inserting successive ones of said at least one retrieval member section based on said frequency of occurrence; and
   means for storing said frequency of occurrence, said insertion sequence, and said size and location data in a memory.

17. A media differentiation and retrieval system for use with a media drive that reads/writes data on a plurality of different media types, each of said media types being individually housed in a data storage element, said data storage element having an opening in one end for securing a leader block, said leader block being attached to the one of said plurality of different media types housed in said data storage element, and a leader block retrieval slot in said leader block that is uniquely keyed to identify the one of said plurality of different media types housed in said data storage element, said media differentiation and retrieval system comprising the steps of:
   aligning a plurality of leader block retrieval members each being attached at the distal end of a media loading arm and having at least one coaxially aligned retrieval member section, wherein each said at least one retrieval member section corresponds to only one uniquely keyed said leader block retrieval slot;
   inserting successive ones of said at least one retrieval member section from said plurality of leader block retrieval members into said leader block retrieval slot according to an insertion sequence when said data storage element is Inserted into said media drive; and
   retrieving said leader block from said data storage element when one of said at least one retrieval member sections engages said leader block retrieval slot;
   wherein said plurality of leader block retrieval members are attached to said media loading arm when said leader block is retrieved from said data storage element to travel along a media mounting path within said media drive; and
   wherein an engaged one of said plurality of leader block retrieval members is in a first position for engaging said leader block retrieval slot while unengaged ones of said plurality of leader block retrieval members are in a second position proximate to said first position to avoid engaging said leader block retrieval slot and to avoid engaging structure within said media drive proximate to said media mounting path during media mounting.

18. The media differentiation and retrieval system of claim 17 including the steps of:
   storing data in a memory, said data being indicative of size and location of said at least one retrieval member section on said plurality of leader block retrieval members.

19. The media differentiation and retrieval system of claim 18 further including the steps of:
   determining size and location of said at least one retrieval member section on said plurality of leader block retrieval members relative to a benchmark member that is within reach of said media loading arm.

20. The media differentiation and retrieval system of claim 18 further including the steps of:
   calculating a frequency of occurrence of each said media type encountered by said media drive;

updating an insertion sequence for said inserting successive ones of said at least one retrieval member section; and storing said frequency of occurrence and said insertion sequence in said memory.

21. The media differentiation and retrieval system of claim 17 wherein said plurality of leader block retrieval members includes the steps of:

retracting at least one of said plurality of leader block retrieval members within said media loading arm; and extending each of said plurality of leader block retrieval members one at a time from within said media loading arm.

22. The media differentiation and retrieval system of claim 17 including the steps of:

rigidly extending at least two of said plurality of leader block retrieval members from a rotatable mounting at the distal end of said media loading arm.

23. The media differentiation and retrieval system of claim 17 including the steps of:

rigidly extending at least two of said plurality of leader block retrieval members from the distal end of said media loading arm; and inserting successive ones of said at least one retrieval member section into said leader block retrieval slot, by positioning said media loading arm.

24. The media differentiation and retrieval system of claim 17 including the steps of:

pre-defining said insertion sequence.

25. The media differentiation and retrieval system of claim 24 wherein said pre-defining said insertion sequence is sequential from a first retrieval member section located at a first retrieval member end through each adjacent retrieval member section to a last retrieval member section located at a second retrieval member end for each of said plurality of leader block retrieval members.

26. The media differentiation and retrieval system of claim 24 wherein said pre-defining said insertion sequence is non-sequential selected from the group consisting of: frequency of occurrence of encountering said media types, next most probable choice in view of past events, next most probable choice in view of past choices, interval halving, and random.

27. The media differentiation and retrieval system of claim 17 including the steps of:

selecting said insertion sequence in real time from a plurality of sequences included in the group consisting of: sequential, frequency of occurrence of encountering said media types, next most probable choice in view of past events, next most probable choice in view of past choices, interval halving, and random.

28. The media differentiation and retrieval system of claim 17 wherein said retrieving includes the steps of:

drawing said leader block along a media loading path through said media drive.

29. The media differentiation and retrieval system of claim 17 wherein said retrieving includes the steps of:

drawing said media type toward said media drive, said media type being slidably mounted within said data storage element.

30. The media differentiation and retrieval system of claim 17 wherein said retrieving includes the steps of:

drawing a media interface from within said data storage element into said media drive for reading/writing to said media type.

31. The media differentiation and retrieval system of claim 17 wherein said retrieving includes the steps of:

inserting a media interface into said data storage element for reading/writing to said media type.

32. A media differentiation and retrieval system for use with a media drive that reads/writes data on a plurality of different media types, each of said media types being individually housed in a data storage element, said data storage element having an opening in one end for securing a leader block, said leader block being attached to the one of said plurality of different media types housed in said data storage element, and a leader block retrieval slot in said leader block that is uniquely keyed to identify the one of said plurality of different media types housed in said data storage element, said media differentiation and retrieval system comprising the steps of:

aligning a plurality of leader block retrieval members each being attached at the distal end of a media loading arm and having at least one-coaxially aligned retrieval member section, wherein each said at least one retrieval member section corresponds to only one uniquely keyed said leader block retrieval slot;

inserting successive ones of said at least one retrieval member section from said plurality of leader block retrieval members into said leader block retrieval slot according to an insertion sequence when said data storage element is inserted into said media drive, wherein said insertion sequence is in at least one form selected from the group consisting of sequential, frequency of occurrence of encountering said media types, next most probable choice in view of past events, next most probable choice in view of past choices, interval halving, and random;

retrieving said leader block from said data storage element when one of said at least one retrieval member sections engages said leader block retrieval slot;

determining a size and location of said at least one retrieval member section on said plurality of leader block retrieval members relative to a benchmark member within reach of said media loading arm;

calculating a frequency of occurrence of each said media type encountered by said media drive;

updating an insertion sequence for said means for inserting successive ones of said at least one retrieval member section based on said frequency of occurrence; and storing said frequency of occurrence, said insertion sequence, and said size and location data in a memory.

\* \* \* \* \*

UNITED STATES PATENT AND TRADEMARK OFFICE
CERTIFICATE OF CORRECTION

PATENT NO.    :    5,557,484

DATED         :    September 17, 1996

INVENTOR(S)   :    Michael L. Leonhardt and Charles A. Milligan

It is certified that error appears in the above-identified patent and that said Letters Patent is hereby corrected as shown below:

Title page [*] change as follows:

--Notice:    The term of this patent shall not extend beyond the expiration date of Pat. No. 5,325,249.--

Signed and Sealed this

Twenty-sixth Day of November 1996

Attest:

BRUCE LEHMAN

*Attesting Officer*            *Commissioner of Patents and Trademarks*